3,790,650
METHOD FOR COMPRESSION MOLDING OF THERMOSETTING PLASTICS UTILIZING A TEMPERATURE GRADIENT ACROSS THE PLASTIC TO CURE THE ARTICLE

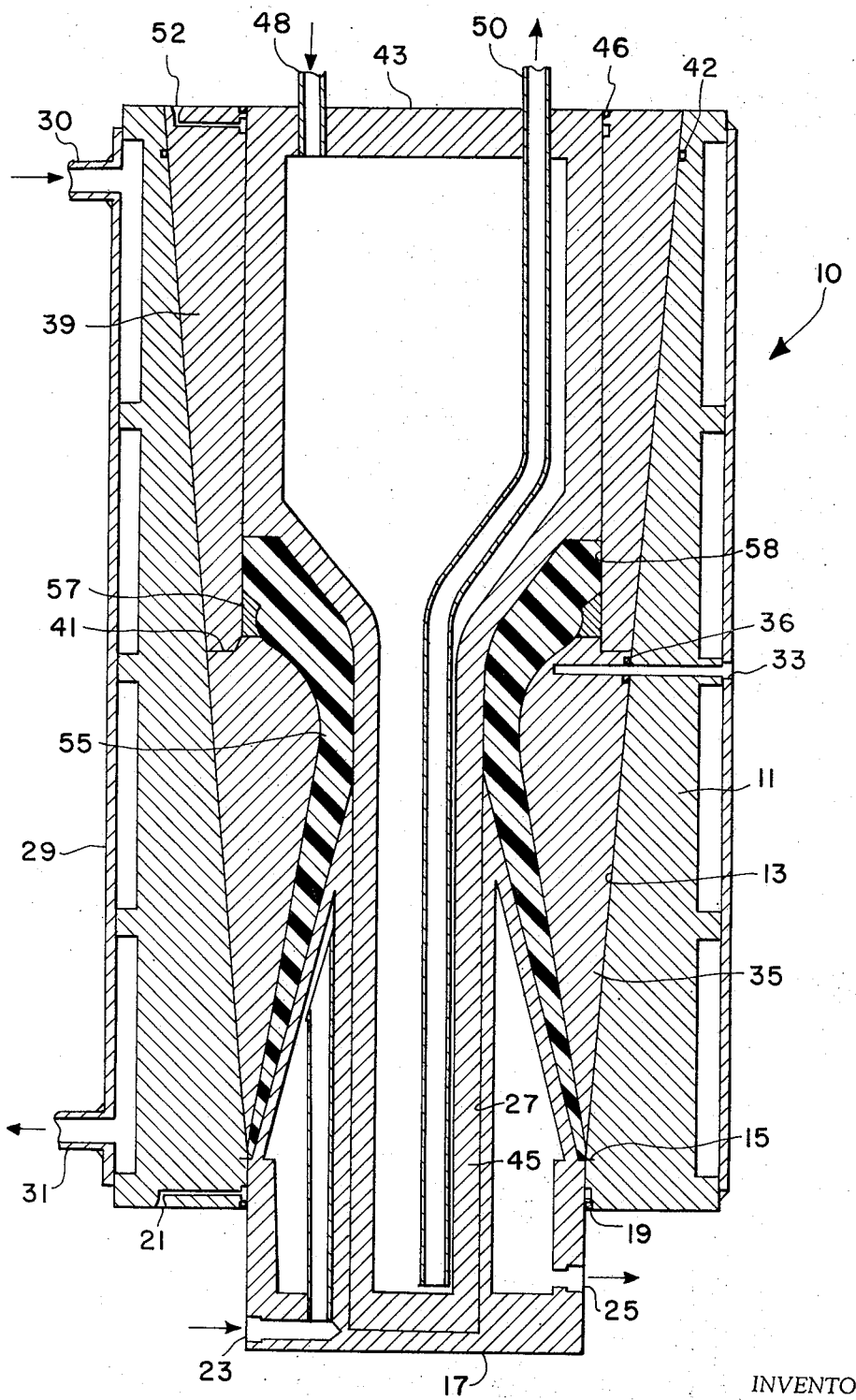

Wilbur C. Heier, Hampton, Va., assignor to the United States of America as represented by the Administrator of the National Aeronautics and Space Administration
Filed Nov. 15, 1971, Ser. No. 198,763
Int. Cl. B29g 1/00
U.S. Cl. 264—102                                         9 Claims

ABSTRACT OF THE DISCLOSURE

Method for compression molding of thermosetting plastics compositions wherein heat is applied to the compressed load in a mold cavity and adjusted to hold molding temperature at the interface of the cavity surface and the compressed compound to produce a thermal front. This thermal front advances into the evacuated compound at mean right angles to the compression load and toward a thermal fence formed at the opposite surface of the compressed compound.

ORIGIN OF THE INVENTION

This invention was made by an employee of the National Aeronautics and Space Administration and may be manufactured and used by or for the Government of the United States without the payment of any royalties thereon or therefor.

BACKGROUND OF THE INVENTION

Thermosetting molded articles are useful in making rocket nozzles, ablation shields and the like which have application to military and space research. Accordingly, efforts are continuously being made to impart the highest possible physical and thermal properties to high density thermosetting molding compounds for use in these applications. One problem heretofore present in most molding processes for thermosetting materials in rocket nozzles and ablation-type heat shields has been the inability of the process to eliminate voids in the final product and to produce stress-free uniform density articles.

It is therefore an object of the present invention to provide a novel molding apparatus for compression molding of thermosetting plastics compositions and assuring that the molded article is purged of damaging by-products evolved during polymerization.

Another object of the present invention is to provide a novel process for producing void-free compression molded thermosetting articles.

Another object of the present invention is a process of compression molding plastics articles having improved structural integrity and form-retention values when subjected to high temperatures.

A further object of the present invention is a compression molding process employing a unidirectional thermal front to effect polymerization of the molding compound.

Another object of the present invention is a molding process for imparting the highest possible physical and thermal properties to high density thermosetting molding compounds.

Another object of the present invention is a molding process that increases the thermal conductivity of the molding composition to its highest, most desirable value while the permeability of the composition is still sufficient for the passage of gases and volatiles.

BRIEF DESCRIPTION OF THE INVENTION

The foregoing and other objects of the present invention are attained by providing an elongated female mold having a central longitudinally extending cavity therethrough. The cavity through the female mold is of a substantially larger diameter at the upper end of the mold than at the lower end and is uniformly tapered along the major length thereof. A thermal jacket is provided around the exterior surface of the female mold with a suitable inlet and outlet being provided for circulating a thermal transfer fluid around the female mold. A plurality of thermocouple wells extend through the female mold wall and thermal jacket to provide installation of thermocouples adjacent the interior of the female mold cavity.

A tubular forming ring consisting of a pair of split halves is disposed within the female mold cavity to provide the external contour for the molded article. This forming ring has an external contour tapering toward the base of the female mold cavity so as to provide a tight, sliding fit within the cavity. Suitable openings are provided in the forming ring halves to coincide with the thermocouple openings in the female mold to accommodate the thermocouples.

A tubular pot ring having an external tapered configuration and a straight internal contour is releasably secured in the large end of the female mold and adapted to be received at one end in a groove formed in the forming ring. An upper force plug is slidably received by the pot ring and provided with an elongated reduced diameter portion. The upper force plug is substantially hollow throughout its length, and is provided with an inlet and an outlet for circulating a thermal transfer fluid therethrough.

A lower force plug is slidably received by the small end of the female mold cavity and is provided with an opening therein for receiving the reduced diameter extension of the upper force plug. The major length of the lower force plug tapers inwardly sharply. This force plug is also substantially hollow and is provided with an inlet and an outlet for circulating a thermal transfer fluid through the plug.

Each of the force plugs is adapted for attachment to actuating rams of a conventional compression molding apparatus which may be hydraulic, pneumatic or otherwise energized in a conventional manner to exert the desired force on the respective mandrels.

The molded article configuration is dictated internally by the two force plugs and externally by the internal configuration of the forming ring and the pot ring.

A preweighed amount of the molding compound is poured into the mold cavity with the two force plugs then moved into sealing engagement with the female mold and the loaded cavity is evacuated by vacuum for at least thirty minutes. A thermal transfer fluid is circulated through the upper and lower force plugs to maintain a temperature of 240–245° F. on their respective cavity surfaces. Thermal fluid input to the female mold jacket is adjusted to maintain 190–195° F. on its outside diameter. A force of 2500 p.s.i. on the maximum horizontal projected cavity area is applied to the upper force plug until it is received entirely within the pot ring. An equal amount of pressure is applied to the lower force plug and maintained. When all travel of the force plug has ceased, i.e., the mold is in the closed position, the thermal input to both force plugs is adjusted to maintain 325–330° F. on their respective cavity surfaces. When the outer surface cavity reaches a temperature of 260° F., approximately seventy-five minutes, the thermal input to the female mold jacket is adjusted to 325–350° F. and all temperatures maintained for approximately sixty minutes to obtain final mold cure.

BRIEF DESCRIPTION OF THE DRAWINGS

The single figure of the drawing is a sectional view of the molding apparatus employed in the present invention with parts omitted for clarity.

DETAILED DESCRIPTION OF THE INVENTION

Referring now more particularly to the drawing, the single figure shows a sectional view of the molding apparatus of the present invention, as generally designated by reference numeral 10. As shown therein, molding apparatus 10 includes a female chase mold 11 having a longitudinal central cavity 13 extending therethrough. Cavity 13 is essentially of a straight tapered configuration tapering from a relatively small diameter at point 15 near the base thereof to a relatively large diameter at the upper end of the cavity as shown in the drawing. The internal diameter of cavity 13 is of uniform straight diameter from point 15 to the base of mold 11. A lower force plug 17 is slidably received within cavity 13 at the base of mold 11 and adapted to form a seal with the cavity by an O-ring seal 19. Female chase mold 11 is provided with a first vacuum port 21 at the base thereof and serving to provide fluid communication between cavity 13 and a suitable vacuum pump (not shown).

Lower force plug 17 is substantially hollow and is provided with a thermal transfer fluid inlet 23 and outlet 25 for circulating a thermal transfer fluid through the plug. A longitudinal central cavity 27 is also provided extending substantially through plug 17 as will be further explained hereinafter.

A thermal jacket 29 is secured around the exterior of female mold 11 and provided with a suitable inlet 30 and outlet 31 for circulating a thermal transfer fluid around the female mold. Jacket 29 is provided with a plurality of thermocouple wells, one of which is shown and designated by reference numeral 33, which extend through the jacket 29, mold 11 and into a tubular forming ring 35 provided in cavity 13. A suitable O-ring seal 36 serves to seal thermocouple well 33 at the intersection thereof with female mold 11 and forming ring 35. These thermocouple wells permit installation of a plurality of thermocouples adjacent the interior of the mold cavity to provide close control of the molding temperature.

Tubular forming ring 35 has a tapered exterior diameter to conform with the internal taper of cavity 13. The interior diameter of the forming ring is, as the name implies, shaped to form the exterior diameter of the molded article. Forming ring 35 is constructed of a pair of split halves to provide easy installation and removal thereof. The exterior of the forming ring is contoured so as to provide a tight sliding fit within cavity 13.

A tubular pot ring 39 is slidably received at the large end of cavity 11. Pot ring 39 is provided with an external tapered configuration to coincide with the tapered cavity 13 and a straight internal contour. The tip portion of ring 39 is received by and adapted to mate with a circumferential groove formed in forming ring 35. A suitable O-ring seal 42 serves to seal the exterior of pot ring 39 in cavity 13.

An upper force plug 43 is slidably received by the interior straight contour of pot ring 39. Upper force plug 43 is also provided with an inwardly tapering area which leads to a straight elongated reduced diameter extension 45. This elongated extension is of substantially the same exterior configuration as the internal configuration of the longitudinally extending cavity of lower force plug 17 and is adapted to be received thereby when the molding apparatus is closed, as shown in the drawing. A suitable O-ring seal 46 serves to provide a hermetic seal between upper force plug 43 and pot ring 39. Upper force plug 43 is also substantially hollow throughout its length, including extension 45 and is provided with an inlet 48 and an outlet 50 for circulating a thermal transfer fluid therethrough. A second vacuum port 52 leads from the upper end of cavity 13 just below seal 46 therein, through pot ring 39, to a suitable vacuum pump (not shown).

Each of force plugs 17 and 43 is adapted for attachment to suitable actuating rams in a conventional molding apparatus which may be energized in a conventional manner by hydraulic, pneumatic or other conventional energizing system to exert the desired force on the respective plugs. Female chase mold 11 is attached to a stationary press plate (not shown) during a molding operation, as is conventional.

The specific embodiment described herein for molding apparatus 10 is designated to mold a rocket nozzle 55 having a nozzle insert ring 57 integrally molded thereto. Insert ring 57 is provided with suitable holes around the exterior circumference thereof (not shown) to provide attachment thereof with a suitable rocket motor by bolts or other conventional attachments. Also the interior circumference of ring 57 is formed with suitable flanges, extensions or the like (not shown) to extend into the body of the molded nozzle 55 to form a tight engagement with the nozzle body. The configuration of nozzle 55 is dictated by cavity 58 bounded internally by the exterior of the two force plugs and externally by pot ring 39 and forming ring 35, as shown.

MOLDING PROCESS

In a molding operation the parts are assembled as shown in the drawing, including the nozzle insert ring 57 and with the exception that cavity 58 is empty. Nozzle insert ring 57 is positioned, as shown, resting on forming ring 35 within cavity 58 with retention thereof being assured by gravity and the forces exerted by molding pressures. Upper force plug 43 is then removed from pot ring 39 a sufficient distance to expose the tapered portion of the force plug and a preweighed quantity of the molding compound is poured into cavity 58. Lower force plug 17 is engaged and blocked in a conventional manner just far enough into female chase mold 11 to effect sealing with O-ring 19. Force plug 43 is then moved toward the closed position a sufficient distance to effect sealing of cavity 58 with O-ring seal 46. The loaded cavity is then evacuated by a suitable vacuum pump via ports 21 and 52 at a mercury pressure of from one-to-five mm. for twenty-to-thirty minutes. Steam, hot oil or other conventional thermal transfer fluid is circulated through inlets 23, and 48 in the force plugs and out respective outlets 25, and 50 to achieve and maintain a temperature of 240–245° F. on the cavity surfaces while maintaining the vacuum pressure. Thermal transfer fluid input to jacket 29 is flowed through inlet 20 and out outlet 31 and adjusted to maintain 190–195° F. on its outside diameter. This maintains a thermal guard which assists the force plugs in raising the temperature throughout the compound to the minimum gradient required for polymerization. A force of 2500 p.s.i. on the maximum horizontal projected cavity area is applied to the upper force plug 43 until it is received entirely within pot ring 39. An equal amount of pressure is applied to lower force plug 17 and maintained to force it off the blocks and into the female chase mold 11. When all travel of the force plug has ceased, i.e., the mold is in the closed position shown in the drawing, the thermal input to upper force plug 43 and lower force plug 17 is adjusted to maintain 325–330° F. on their respective cavity surfaces. A dwell time of approximately seventy-five minutes is normally required for the thermal front to advance from the interior cavity surfaces to the exterior of the molding compound. This is detected by a thermocouple in well 33 indicating a temperature of 260° F. The thermal input to female chase 11 is then adjusted to 325–330° F. and a dwell time of approximately sixty minutes results in final mold cure.

Thus, the use of individual thermal control for thermal jacket 29 and force plugs 17 and 43 assures that at least two major cavity surfaces, at mean right angles to the line of applied pressure and contained on separate mold parts, may serve as thermal fences. Molding cycles begin by compressing the compound in the cavity as much as possible under the selected molding pressure at ambient temperature. In this form, under the high pressure, thermal conductivity of the compound is increased to the highest, most desirable value while the permeability is still sufficient for the passage of gases and volatiles. After this, heat is applied to the cavity surfaces and adjusted to hold molding temperature at the interface of the surface and the compressed compound. This causes a thermal front to advance into the molding compound parallel to the surface of origination, at mean right angles to the compression forces on the force plugs 17 and 43 and toward the other thermal fence created by the heat applied to thermal jacket 29. Thus, thermal energy arriving at the thermal jacket fence sufficient to effect thermosetting of the compound must be only that routed through the molding compound and this phase is considered complete when the interface at the jacket thermal fence registers polymerization temperatures. Application of molding temperatures to all cavity surfaces then completes the cure cycle.

After this curing cycle all thermal and pressure input is ceased and the entire assembly allowed to cool to room temperature. Each of the heated elements may be selectively force cooled by reversing the flow of the thermal transfer fluid, in a conventional manner, i.e., the conditioning of the hot fluid is reversed to cause a cooling fluid to flow through the component parts. Lower force plug 17 is then easily removed from female chase mold 11 and the entire assembly of upper force plug 43, pot ring 39, the molded nozzle 55 and forming ring 35 is removed from the top of tapered cavity 13 in female mold 11. The split construction of forming ring 35 facilitates the separation of the molded nozzle 55 therefrom while upper force plug 43 is easily separated from the nozzle.

Post curing of nozzle 55 is dependent upon the particular composition employed to mold the nozzle. A phenolic impregnated glass broad goods material cut into one-half inch squares is one material that has been used successfully in the present invention and was post cured in a circulating hot air oven at increasing temperature from 125° F. to 300° F. over a period of 168 hours. This cycle included 125° F. for a dwell time of 8 hours; 150° F. for a dwell time of 16 hours; 175° F. for a dwell time of 24 hours; 200° F. for a dwell time of 36 hours; 225° F. for dwell time of 36 hours; 250° F. for a dwell time of 12 hours; 275° F. for a dwell time of 12 hours; and 300° F. for a dwell time of 24 hours. Other compositions would have different post cure conditions.

The advantages of the present invention over conventional molding is now believed apparent. Since polymerization temperatures are applied only to one major cavity surface, the polymerization of the compound begins at one heat source and progresses on a parallel plane toward the opposite surface. The closing mold moves uniformly under pressure to uniformly compact all of the compound softening in the first stages of polymerization. This is because polymerization is occurring only in a plane at righ angles to the line of applied pressure. Volatiles and gases are thus evolved and forced into the less dense material ahead of the thermal and polymerization front, i.e., toward the opposite cavity surface and toward the vacuum ports. With the compound advancing into the infusible C-stage, or fully cured condition, behind the polymerization front, the compaction forces remain uniform on the still softening material due to the parallel plane of the advancing thermal front.

Although the invention has been described relative to a specific molded configuration, i.e., a rocket nozzle, it is not so limited and by changing the interior mold configuration the present invention is readily adaptable to molding ablation nose cones, billets or other structures from thermosetting molding compositions. Also, no particularly molding composition has been discussed in detail the invention is deemed applicable to any thermosetting material having the molding temperatures, curing, pressures and post curing characteristics described herein. One specific thermosetting material that has been employed to mold rocket nozzles is a phenolic impregnated glass broad goods cut into one-half inch squares. This material consists of from 30–37% phenolic resin and 63–70% glass cloth and was used to mold a nozzle having a 1.87 specific gravity. Phenolic resins of this type comply with performance specification MIL-R-9299, Type II and are available, for example, from Fiberite West Coast Corporation, 690 N. Lemon St., Orange, Calif. under the label designated as MXB-6001 "Phenolic Resin." Other molding compositions obviously would be useful in practicing the present invention with the appropriate adjustments being made in the molding temperatures, pressures and post curing. The quantity of molding composition utilized in a specific molding operation is determined by first filling the mold cavity with water, weighing the quantity of water required and multiplying this weight by the specific gravity of the final article desired.

There are obviously many variations and modifications of the present invention that will be readily apparent to those skilled in the art in the light of the above teachings. It is therefore to be understood that the invention may be practiced otherwise than as specifically described herein.

What is claimed as new and desired to be secured by Letters Patent of the United States is:

1. A method of compression molding of a thermosetting plastics rocket nozzle comprising the steps of:
   (a) providing an elongated female mold having a cavity extending therethrough that is of a substantially larger diameter at one end than at the other end and being uniformly tapered along the major length thereof,
   (b) providing a thermal jacket circumferentially disposed about said female mold,
   (c) positioning a tubular forming ring adjacent the smaller end of said female mold cavity and in sealing relationship therewith.
   (d) slidably positioning a tubular pot ring in contact with the tubular forming ring adjacent the large end of the tapered female mold cavity.
   (e) positioning the female mold so that the cavity therein extends vertically with the large tapered portion thereof at the top,
   (f) positioning a substantially hollow bottom force plug member so as to be slidably received by the small end of the female mold cavity and hermetically sealed therewith,
   (g) loading a controlled amount of thermosetting compound into the mold cavity at the top thereof, said thermosetting compound having a softening temperature in the range of 240–245° F. and a curing temperature in the range of 325–330° F.,
   (h) inserting a substantially hollow top force plug in slidably and hermetically sealed relationship within the tubular pot ring,
   (i) applying a vacuum to the closed cavity of from one-to-five mm. pressure for from twenty-to-thirty minutes,
   (j) circulating a thermal transfer fluid through each of the force plugs and the thermal jacket to achieve a temperature of 240–245° F. on the cavity surfaces while maintaining the vacuum pressure.
   (k) adjusting the thermal transfer fluid input to maintain a temperature of 190–195° F. on the outside cavity diameter,
   (l) applying a force of approximately 2500 p.s.i. on the maximum horizontal projected area by the top-force plug until it is received entirely within the pot ring, (m) applying an equal force to the bottom force plug to force it into the female mold cavity, (n) after all force plug travel has ceased, adjusting the thermal input to the top force plug and the bottom force plug to achieve and maintain a temperature of 325–330° F. on their respective cavity surfaces for approximately seventy-five minutes to thereby cause a thermal front to advance toward the thermal fence created by the thermal jacket, (o) when the temperature of the cavity exterior reaches 260° F., adjusting the thermal input to the thermal jacket to 325–330° F. and maintaining this temperature on both force plugs and the thermal jacket for approximately sixty minutes to effect final cure of the thermosetting compound.

2. The method of claim 1 wherein the molded configuration formed is a rocket nozzle and including the step of molding a nozzle insert integral with the nozzle.

3. The method of claim 1 including the steps of force-cooling the bottom force plug to cause thermal shrinkage thereof, removing the bottom force plug from the female mold cavity, and removing the molded configuration along with the top force plug, pot ring and forming ring from the top of the female mold.

4. The method of claim 3 wherein the tubular forming ring is formed of split halves to facilitate the removal thereof from the final molded nozzle.

5. A method of compression molding a thermosetting plastics rocket nozzle comprising the steps of:

(a) providing a mold cavity of the configuration desired for the final nozzle form, (b) loading a preweighed quantity of thermosetting material into the cavity, said thermosetting material having the inherent physical property characteristic of softening in the temperature range of 240–245° F. and of being cured in the temperature range of 325–330° F., (c) evacuating the loaded cavity to remove air and moisture and maintaining the vacuum throughout the process, (d) heating the interior and exterior of the loaded cavity to a temperature adequate to liquefy and plasticize the thermosetting material therein, (e) reducing the temperature on the exterior cavity surface to hold a thermal fence on the cavity exterior surface of a temperature high enough to maintain the thermosetting composition in the melted state but less than the thermosetting temperature thereof, (f) increasing the temperature on the interior of the loaded cavity to mold temperature of the compound and maintaining this temperature until a thermal front therefrom advances through the thermosetting molding compound to the thermal fence created on the cavity exterior surface to thereby cause any volatiles and gases evolved to be forced ahead of the thermal and polymerization front and be evacuated, (g) thereafter, increasing the temperature on both the interior and exterior cavity surfaces at a sufficient level and time to effect final curing of the thermo- the thermosetting compound.

6. The method of claim 5 wherein the thermosetting material employed is a phenolic resin.

7. The method of claim 5 wherein the thermosetting material is a phenolic impregnated glass broad goods cut into small pieces and consisting of 30–37% phenolic resin and 63–70% glass cloth.

8. The method of claim 5 wherein the interior and exterior cavity surfaces are heated to a temperature of 240–245° F. to effect melting of the thermosetting material and the thermal fence on the exterior cavity surface is thereafter reduced to maintain a temperature of 190–195° F. to create a thermal fence and maintain the thermosetting material liquefied.

9. The method of claim 8 wherein the interior cavity surface temperature is increased to 325–330° F. to cause a thermal and polymerization front to advance toward the thermal fence maintained on the exterior cavity surface.

References Cited
UNITED STATES PATENTS

| | | | |
|---|---|---|---|
| 3,307,221 | 3/1967 | Bolner | 425—352 X |
| 2,542,263 | 2/1951 | Schultz | 264—327 |
| 1,627,209 | 5/1927 | Smith | 264—327 X |
| 2,911,678 | 11/1959 | Brunfeldt | 264—327 X |

ROBERT F. WHITE, Primary Examiner

T. P. PAVELKO, Assistant Examiner

U.S. Cl. X.R.
264—274, 325, 327